US009951639B2

(12) United States Patent
Ivakitch et al.

(10) Patent No.: US 9,951,639 B2
(45) Date of Patent: Apr. 24, 2018

(54) VANE ASSEMBLIES FOR GAS TURBINE ENGINES

(75) Inventors: Richard Ivakitch, Mississauga (CA); Andreas Eleftheriou, Woodbridge (CA); David Denis, Burlington (CA); David Menheere, Georgetown (CA)

(73) Assignee: Pratt & Whitney Canada Corp., Longueuil (CA)

( * ) Notice: Subject to any disclaimer, the term of this patent is extended or adjusted under 35 U.S.C. 154(b) by 600 days.

(21) Appl. No.: 13/358,889

(22) Filed: Feb. 10, 2012

(65) Prior Publication Data

US 2013/0205800 A1 Aug. 15, 2013

(51) Int. Cl.

| | |
|---|---|
| ***F01D 9/02*** | (2006.01) |
| ***F01D 11/00*** | (2006.01) |
| ***B23P 17/00*** | (2006.01) |
| ***F02C 3/04*** | (2006.01) |
| ***F01D 9/04*** | (2006.01) |

(52) U.S. Cl.
CPC ............ *F01D 11/005* (2013.01); *F01D 9/042* (2013.01); *F05D 2240/55* (2013.01); *Y10T 29/49245* (2015.01)

(58) Field of Classification Search
CPC ............................... F01D 11/005; F01D 9/042
USPC ............ 415/189, 199.5, 209.2, 209.3, 209.4; 416/193 A, 221; 29/889.22
See application file for complete search history.

(56) References Cited

U.S. PATENT DOCUMENTS 3,070,353 A * 12/1962 Welsh ........................ 415/209.2
3,588,267 A 6/1971 Wilkinson et al.
3,836,282 A * 9/1974 Mandelbaum et al. ... 415/209.4
3,997,280 A * 12/1976 Germain ....................... 415/189
4,169,692 A * 10/1979 McDonough et al. ....... 415/115
4,384,822 A * 5/1983 Schweikl et al. ............. 415/137
4,569,438 A * 2/1986 Sheffler ........................... 206/37
4,940,386 A 7/1990 Feuvrier et al.
5,074,752 A 12/1991 Murphy et al.
5,129,783 A * 7/1992 Hayton ...................... 415/209.3
5,421,703 A * 6/1995 Payling ...................... 415/209.4
5,494,404 A * 2/1996 Furseth ................... F01D 9/042 415/209.3

(Continued)

FOREIGN PATENT DOCUMENTS

JP 2010-229837 * 10/2010 ............ F01D 5/282
WO WO2012004336 A2 * 1/2012

OTHER PUBLICATIONS

Dupont NPL, Dupont Home Page > All Productes & Services Categories > Plastics, Polymers & Resins > Elastomers > Cable Insulation and Jacketing. URL: http://www.dupont.com/products-and-services/plastics-polymers-resins/elastomers/uses-and-applications/high-performance-cable-insulation.html.*

*Primary Examiner* — Woody Lee, Jr.
*Assistant Examiner* — Brian O Peters
(74) *Attorney, Agent, or Firm* — Norton Rose Fulbright Canada LLP

(57) ABSTRACT

Vane assemblies for gas turbine engines and methods for assembling vane assemblies are disclosed. The vane assemblies may include at least one shroud having at least one vane-receiving portion, at least one vane having at least one end portion received in the vane-receiving portion, and at least one sealing member having an uncompressed cross-section that is substantially circular. The sealing member(s) are disposed between and in contact with the end portion of the vane and the vane-receiving portion of the shroud.

20 Claims, 7 Drawing Sheets

(56) References Cited

U.S. PATENT DOCUMENTS

| | | | | | |
|---|---|---|---|---|---|
| 5,547,342 | A | | 8/1996 | Furseth et al. | |
| 5,569,019 | A | | 10/1996 | Katariya et al. | |
| 5,630,700 | A | * | 5/1997 | Olsen et al. | 415/134 |
| 5,797,725 | A | * | 8/1998 | Rhodes | 415/209.2 |
| 6,464,456 | B2 | * | 10/2002 | Darolia et al. | 415/134 |
| 6,543,995 | B1 | * | 4/2003 | Honda et al. | 415/189 |
| 6,595,747 | B2 | | 7/2003 | Bos | |
| 6,619,917 | B2 | | 9/2003 | Glover et al. | |
| 6,910,860 | B2 | | 6/2005 | Glover et al. | |
| 7,052,234 | B2 | * | 5/2006 | Wells et al. | 415/137 |
| 7,311,495 | B2 | | 12/2007 | Ashley et al. | |
| 7,413,400 | B2 | | 8/2008 | Barnett | |
| 7,494,316 | B2 | | 2/2009 | Barnett et al. | |
| 7,530,782 | B2 | | 5/2009 | Barnett et al. | |
| 7,614,848 | B2 | | 11/2009 | Bogue et al. | |
| 7,628,578 | B2 | | 12/2009 | Barnett et al. | |
| 7,637,718 | B2 | * | 12/2009 | Barnett et al. | 415/119 |
| 8,926,262 | B2 | * | 1/2015 | Tanahashi et al. | 415/9 |
| 2012/0009071 | A1 | * | 1/2012 | Tanahashi | F01D 5/282<br>416/241 B |
| 2013/0004294 | A1 | * | 1/2013 | Marra et al. | 415/115 |
| 2013/0216359 | A1 | * | 8/2013 | Brandenburg et al. | 415/148 |

* cited by examiner

VANE ASSEMBLIES FOR GAS TURBINE ENGINES

TECHNICAL FIELD

The disclosure relates generally to gas turbine engines, and more particularly to vane assemblies in gas turbine engines.

BACKGROUND

Vane assemblies are usually provided in gas turbine engines downstream of a fan and/or may be part of a low pressure compressor. Vane assemblies may be used to redirect an air stream such as, for example, reducing a swirl movement of an air stream in a compressor of a gas turbine engine.

Vane assemblies may comprise radially inner and/or outer shrouds or supports to which vanes are secured. The vanes may be secured to inner and/or outer shrouds via resilient grommets that provide both a seal between the vanes and the shroud(s) and damping of vibrations. Grommets usually need to be molded to fit the exact shape of the vanes either before or during installation. Also, in order to maintain an adequate sealing function, such grommets usually require a radial pre-load of the vanes to be maintained. Accordingly, the use of such grommets can render the installation and assembly of such vane assemblies relatively complex and labor intensive.

Improvement in vane assemblies is therefore desirable.

SUMMARY

There is provided, in accordance with one aspect of the present disclosure, a vane assembly for use in a gas turbine engine, the assembly comprising: at least one shroud having at least one vane-receiving portion; at least one vane having at least one end portion received in the at least one vane-receiving portion of the at least one shroud; and at least one sealing member having an uncompressed cross-section that is substantially circular, the at least one sealing member being disposed between and in contact with the at least one end portion of the at least one vane and the at least one vane-receiving portion of the at least one shroud.

There is also provided, in accordance with another aspect, a gas turbine engine comprising: at least one inlet, compressor, combustor and turbine section in serial flow communication; and at least one vane assembly disposed downstream from the at least one inlet, the at least one vane assembly including: at least one radially inner shroud having at least one inner vane-receiving portion; at least one radially outer shroud having at least one outer vane-receiving portion; at least one vane having at least one inner end portion received in the at least one inner vane-receiving portion of the inner shroud and at least one outer end portion received in the outer vane-receiving portion of the at least one outer shroud; and at least one sealing member having an uncompressed cross-section that is substantially circular, the at least one sealing member being disposed between the at least one vane and at least one of the at least one inner vane-receiving portion of the at least one inner shroud and the at least one outer vane-receiving portion of the at least one outer shroud.

There is further provided, in accordance with another aspect, a method for assembling a vane assembly for use in a gas turbine engine wherein the vane assembly comprises at least one vane and at least one shroud, the method comprising: installing at least one sealing member having an uncompressed cross-section that is substantially circular on one of: at least one end portion of the at least one vane; and at least one vane-receiving portion on the at least one shroud; and installing the at least one end portion of the at least one vane in the at least one vane-receiving portion to establish contact of the at least one sealing member with the at least one end portion of the at least one vane and the at least one vane-receiving portion.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

Figure 1:
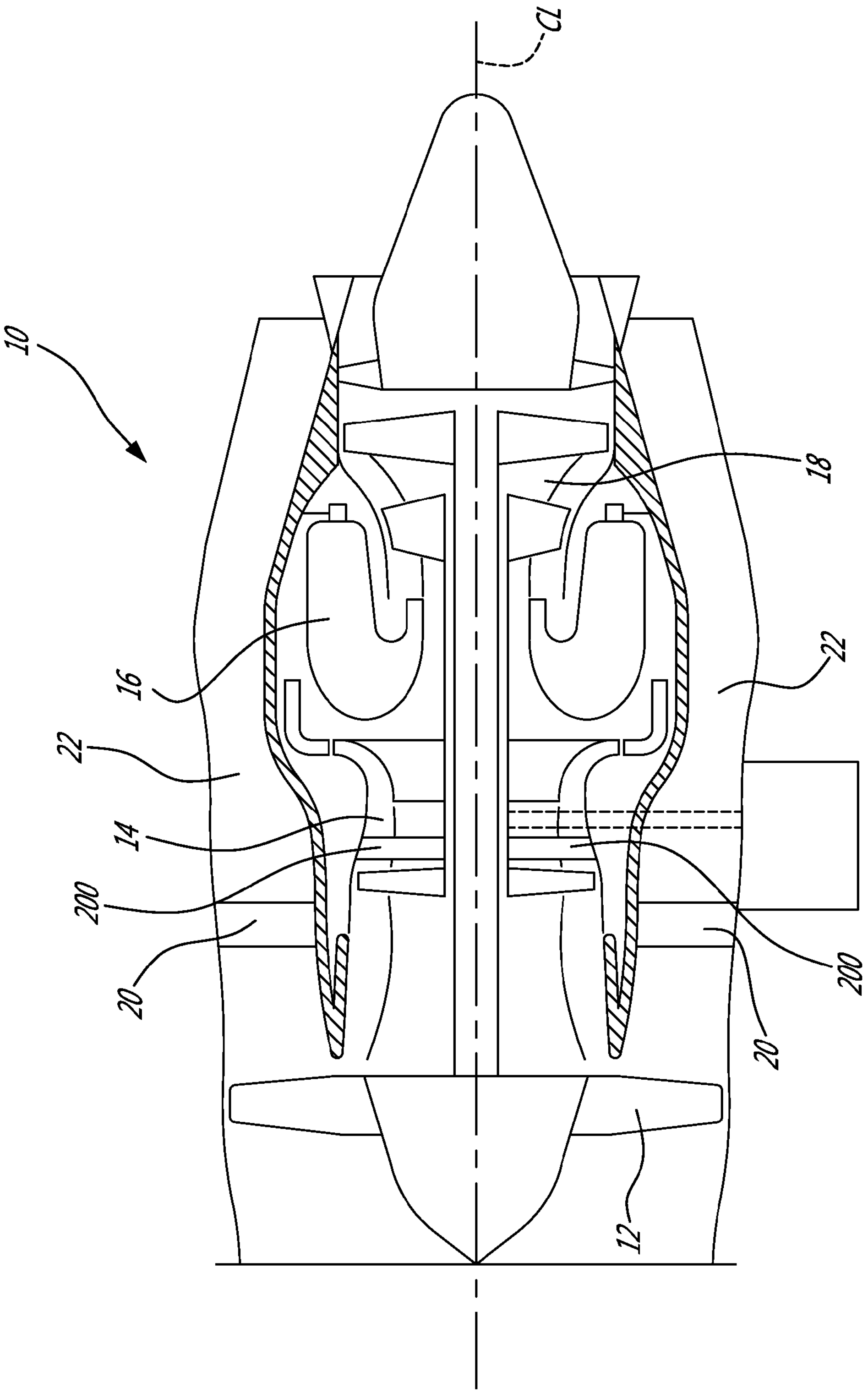
FIG. 1 is an axial cross-section view of a turbofan gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 including at least one turbine for extracting energy from the combustion gases. Engine 10 may comprise vane assembly(ies) 20 and/or 200. Vane assembly(ies) 20 may be disposed in bypass duct 22 of engine 10. Vane assembly(ies) 200 may be disposed in multistage compressor 14 in a core section of engine 10. Bypass duct 22 may define an annular passage (e.g. gas path) for some of the airflow through engine 10 to bypass the core section of engine 10. Although gas turbine engine 10 is illustrated as a turbofan engine, it is understood that the devices, assemblies and methods described herein could also be used in conjunction with other types of gas turbine engines such as, for example, turboshaft and/or turboprop engines.

Figure 2:
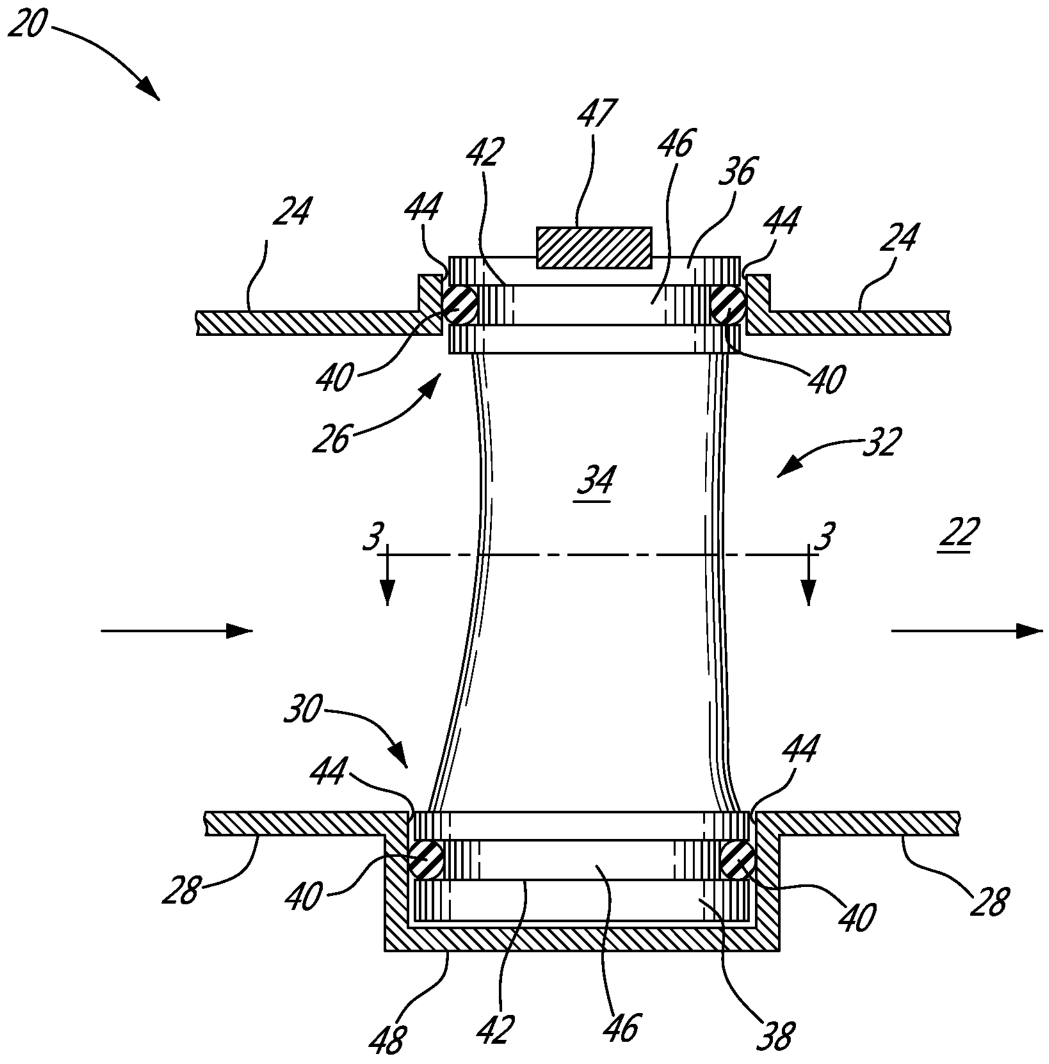
FIG. 2 is a partial axial cross-section view of the engine of FIG. 1 showing a vane assembly in a bypass duct of the engine.

FIG. 2 shows an axial cross-section view of engine 10 specifically showing vane assembly(ies) 20. Vane assembly(ies) 20 may comprise outer shroud(s) 24 having outer vane-receiving portion(s) 26. For example, outer shroud(s) 24 may include or be part of a radially outer casing of bypass duct(s) 22. Vane assembly(ies) 20 may also comprise inner shroud(s) 28 having inner vane-receiving portion(s) 30. For example, inner shroud(s) 28 may include or be part of a radially inner casing of bypass duct(s) 22. Vane assembly(ies) 20 may comprise at least one vane 32. For example, vane assembly(ies) 20 may comprise a plurality of vanes 32 circumferentially distributed in bypass duct(s) 22. Vane(s) 32 may include airfoil-shaped body(ies) 34, outer end portion(s) 36 and inner end portion(s) 38. Vane(s) 32 may be stationary and may be used to re-direct a flow of air through bypass duct(s) 22 and flowing along a gas path illustrated by arrows in bypass duct(s) 22.

Outer vane-receiving portion(s) 26 of outer shroud(s) 24 may comprise at least one opening configured to receive outer end portion(s) 36 of vane(s) 32. Accordingly, outer end portion(s) 36 of vane(s) 32 may extend through outer shroud(s) 24. At least one sealing member(s) 40 may be provided between outer end portion(s) 36 of vane(s) 32 and outer vane-receiving portion(s) 26 of outer shroud(s) 24 to hinder or substantially prevent air from leaving bypass duct 22 through outer vane-receiving portion(s) 26. Sealing member(s) 40 may also provide vibration damping and support for vane(s) 32. Sealing member(s) 40 may be positioned radially away (e.g. outward) from bypass duct(s) 22 in order to be out of the stream of air (e.g. gas path) flowing through bypass duct(s) 22. Accordingly, sealing member(s) 40 may not be directly exposed to rapidly flowing air which could potentially cause lifting, deterioration, erosion and/or other types of wear or performance degradation of sealing member(s) 40. Sealing member(s) 40 may be in the form of a compressible packing having an uncompressed cross-section that is substantially circular (e.g. O-shaped), as shown in FIG. 2. Sealing member(s) 40 may also have an uncompressed cross-section that is substantially uniform along a substantially entire sealing length. As shown in FIG. 2, therefore, the sealing members 40 have a substantially circular cross-sectional shape when the sealing member is in such an uncompressed state, and this uncompressed cross-section is substantially uniform along a substantially entirety of the sealing length of the sealing members 40. As also seen in FIG. 2, the sealing members 40 with a circular cross-sectional shape in the uncompressed state are in contact with both the peripheral groove 42 formed in the end portion 36 of the vane 32 and the vane-receiving portion 26, 30 of the shrouds 24, 28. For example, sealing member(s) 40 may comprise one or more conventional or other types of pre-formed packings such as o-rings. Sealing member(s) 40 may be made from a material that is compressible (e.g. deformable), resilient and of appropriate stiffness to provide some degree of sealing between vane(s) 32 and outer shroud(s) 24 and also provide some vibration damping and support for vane(s) 32. Sealing member(s) 40 may also be made from a material capable of reasonably withstanding the environmental conditions in the applicable region(s) of engine 10. Sealing member(s) 40 may be made from any suitable material(s) conventionally used to produce o-rings and suitable for use in gas turbine applications. For example, sealing member(s) 40 may be made from an electrically insulating material. Sealing member(s) 40 may be made from materials such as, for example, rubber-like material(s), elastomeric material(s), polyurethane, ethylene propylene rubber, nitrile butadiene rubber, silicone rubber, and elastomeric synthetic polymer or copolymer material(s).

Outer end portion(s) 36 of vane(s) 32 may comprise groove(s) 42 for receiving at least a portion of sealing member(s) 40 and outer vane-receiving portion(s) 26 may comprise cooperating contact surface(s) 44. Groove(s) 42 may extend completely around (i.e. peripherally) outer end portion(s) 36 of vane(s) 32. Accordingly, sealing member(s) 40 may comprise o-ring(s) installed in groove(s) 42. Sealing member(s) 40 may be disposed between and configured to contact outer end portion(s) 36 of vane(s) 32 and outer vane-receiving portion(s) 26 of outer shroud(s) 24. For example, a clearance provided between outer end portion(s) 36 of vane(s) 32 and outer vane-receiving portion(s) 26 and groove(s) 42 may be configured so that sealing member(s) 40 make contact with bottom surface(s) 46 of groove(s) 42 and also contact surface(s) 44 of outer vane-receiving portion(s) 26. The clearance between outer end portion(s) 36 of vane(s) 32 and outer vane-receiving portion(s) 26 and groove(s) 42 may also be configured so that sealing member(s) 40 is/are compressed (i.e. deformed) by a desired amount when installed between bottom surface(s) 46 of groove(s) 42 and contact surface(s) 44 of outer vane-receiving portion(s) 26 in order to maintain a desired sealing performance. Accordingly, a radially inward biasing force may not be necessary to maintain a desired sealing performance.

Strap(s) 47 may extend circumferentially about centerline CL of engine 10 and serve to secure vane(s) 32 in position. For example, strap(s) 47 may provide radial support to restrain radial movement of vane(s) 32. Strap(s) 47 may also be configured to exert a radially inward biasing force on vane(s) 32 in order to keep vane(s) 32 properly seated against back wall(s) 48 of inner vane-receiving potion(s) 30 of inner shroud(s) 28. However, any radially inward biasing force provided by strap(s) 47 may not be required to maintain the sealing function of sealing member(s) 40. Accordingly, installation of vane assembly(ies) 20 and strap 47 may be simplified since radial pre-loading of vane(s) 32 may not be necessary to maintain proper sealing function of sealing member(s) 40.

Inner vane-receiving portion(s) 30 of inner shroud(s) 28 may comprise at least one opening configured to receive inner end portion(s) 38 of vane(s) 32. Inner vane-receiving portion(s) 30 of inner shroud(s) 28 may be closed and may be in the form of a recess having back wall(s) 48. Back wall(s) 48 may be integrally formed with inner shroud(s) 28 or may comprise a separate member attached to inner shroud(s) 28. Accordingly, inner end portion(s) 38 of vane(s) 32 may be received in inner vane-receiving portion(s) 30 of inner shroud(s) 28. As described above in relation to outer vane-receiving portion(s) 26, another/other sealing member(s) 40 may be provided between inner end portion(s) 38 of vane(s) 32 and inner vane-receiving portion(s) 30 of inner shroud(s) 24 and be configured in a similar manner or practically identically to the arrangement of outer end portion(s) 36 of vane(s) 32 and outer vane-receiving portion(s) 26. Hence, inner end portion(s) 38 of vane(s) 32 may also comprise groove(s) 42 in which at least a portion of sealing member(s) 40 may be received and inner vane-receiving portion(s) 30 may also comprise contact surface(s) 44 against which sealing member(s) 40 may be in contact and compressed. Groove(s) 42 may be configured (e.g. suitable length, width and depth) to receive at least a portion of sealing member(s) 40. Another portion of sealing member(s) 40 not received in (i.e. protruding from) groove(s) 42 may serve to contact with contact surface(s) 44. Sealing member(s) 40 between inner end portion(s) 38 and inner vane-receiving portion(s) 30 may serve to reduce losses by hindering or substantially preventing air in bypass duct 22 from flowing through a clearance between inner end portion(s) 38 and inner vane-receiving portion(s) 30. Sealing member(s) 40 between inner end portion(s) 38 and inner vane-receiving portion(s) 30 may also serve to damp vibrations. As described above, the clearance between inner end portion(s) 38 of vane(s) 32 and inner vane-receiving portion(s) 30 and groove(s) 42 may also be configured so that sealing member(s) 40 is compressed (i.e. deformed) by a desired amount when installed between bottom surface(s) 46 of groove(s) 42 and contact surface(s) 44 of inner vane-receiving portion(s) 26 in order to maintain a desired sealing, damping and/or support function(s).

Figure 3:
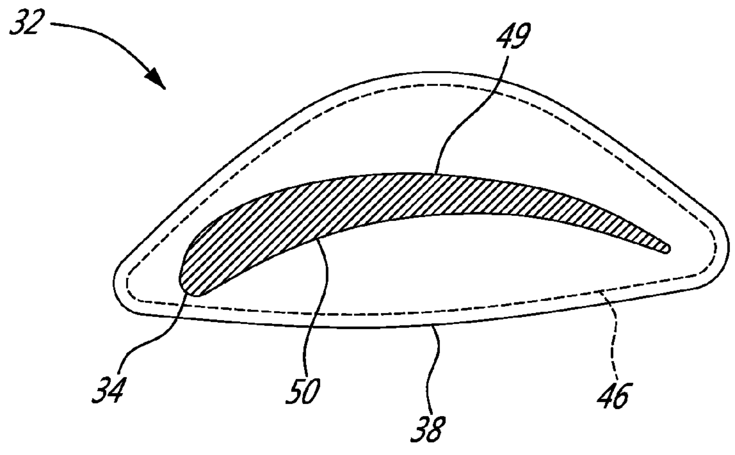
FIG. 3 is a cross-section view of a vane shown in FIG. 2 taken along line 3-3 of FIG. 2.

FIG. 3 shows a cross-sectional view of vane(s) 32 taken along line 3-3 of FIG. 2. Airfoil-shaped body(ies) 34 of vane(s) 32 may comprise a cross-sectional profile which includes convex suction side(s) 49 and concave pressure side(s) 50. However, bottom surface(s) 46 of groove(s) 42 provided in outer end portion(s) 36 and/or inner end portion(s) 38 may not follow the cross-sectional profile of vane(s) 32. For example, groove(s) 42 in outer end portion(s) 36 and/or inner end portion(s) 38 may be configured such that bottom surface(s) 46 is/are free of concave regions (e.g. no negative curvatures). Accordingly, sealing member(s) 40 may make contact with bottom surface(s) 46 along en entire length of bottom surface(s) 46 when installed in groove(s) 42. For example, length of sealing member(s) 40 (e.g. diameter of an o-ring) may be selected so that sealing member(s) 40 is/are stretched by a desired amount (e.g. in tension) when installed in groove(s) 42 in order to keep sealing member(s) 40 biased against bottom surface(s) 46 of groove(s) 42.

Figure 4:
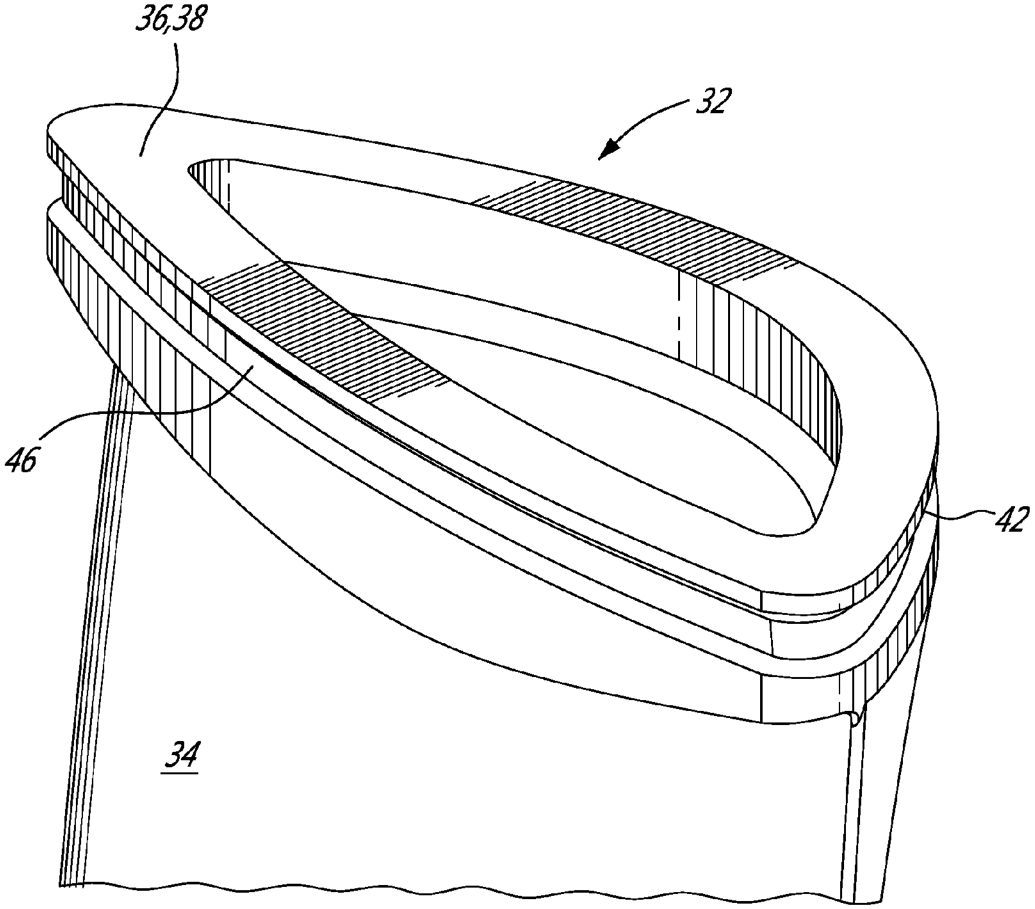
FIG. 4 is a perspective view of an end portion of the vane of FIG. 2.

FIG. 4 shows one of outer end portion(s) 36 and inner end portion(s) 38 of vane(s) 32. As shown, groove(s) 42 may surround (e.g. be peripheral to) end portion(s) 36, 38. Outer end portion(s) 36 and inner end portion(s) 38 may be similarly configured or practically identical.

Figure 5A:
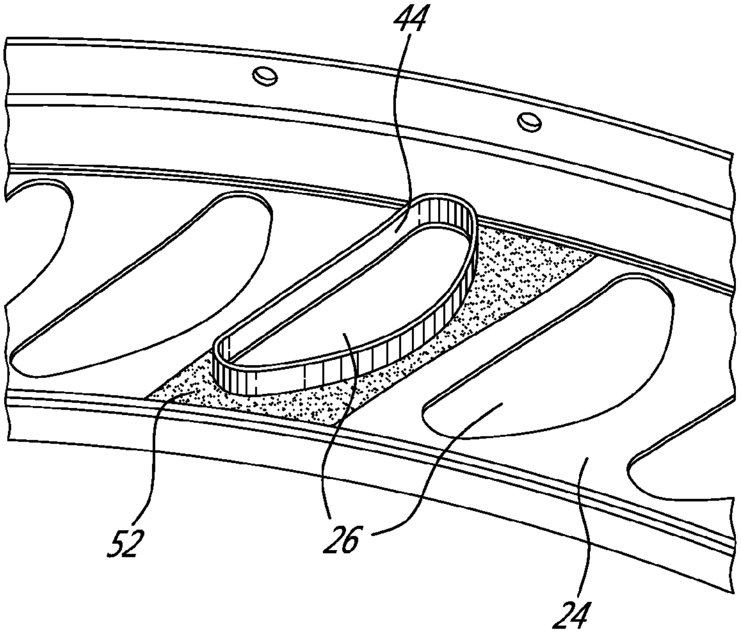
FIG. 5A is a perspective view of a vane-receiving portion provided in a shroud of the vane assembly of FIG. 2 and including a sheet metal contact surface.

FIG. 5A shows an outer portion of outer shroud(s) 24. Outer vane-receiving portion(s) 26 in outer shroud(s) 24 may be configured to permit the insertion of outer end portion(s) 36. Contact surface(s) 44, which may cooperate with sealing member(s) 40 may be provided by a lip integrally formed on outer shroud(s) 24 or may be provided by at least one separate component attached to outer shroud(s) 24. For example, contact surface(s) 44 may be provided by sheet metal member(s) 52 attached to the outer portion of outer shroud(s) 24. Sheet metal member(s) 52 may be formed by stamping or other suitable manufacturing operation(s). Sheet metal member(s) 52 may be welded to outer shroud(s) 24 or otherwise secured to outer shroud(s) 24. An individual sheet metal member 52 may be provided for each outer vane-receiving portion 26 or, alternatively, one sheet metal member 52 may be configured to accommodate a plurality of outer vane-receiving portions 26 in outer shroud(s) 24. Suitable sealing compound may be used, if required, in addition to weld(s) in order to provide proper sealing between sheet metal member(s) 52 and outer shroud(s) 24.

Figure 5B:
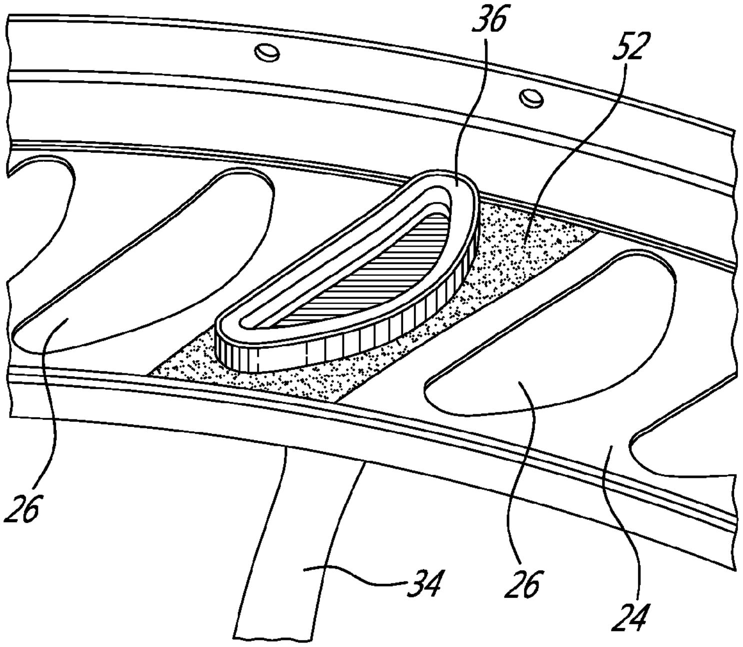
FIG. 5B is a perspective view of the end portion of the vane of FIG. 2 received in the vane-receiving portion of FIG. 5A.

FIG. 5B shows the outer portion of outer shroud(s) 24 as shown in FIG. 5A wherein outer end portion(s) 36 of vane(s) 32 is received and supported in outer vane-receiving portion(s) 26. In this configuration, contact surface(s) 44 (shown in FIG. 5A) may face bottom surface(s) 46 of groove(s) 42 (shown in FIG. 4) and also cooperate with bottom surface(s) 46 to contact and compress sealing member(s) 40 (shown in FIG. 2) by a desired amount to provide a desired sealing, support and/or damping performance(s).

Figure 6A:
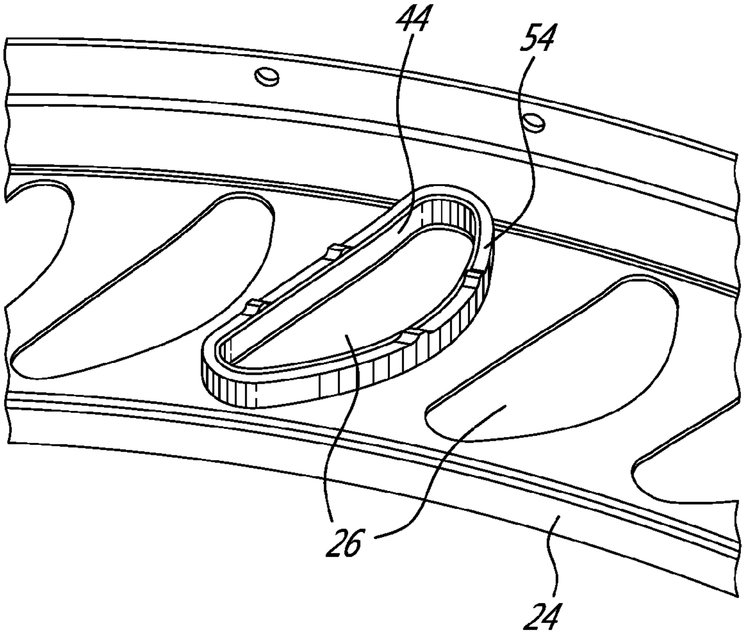
FIG. 6A is a perspective view of a vane-receiving portion provided in a shroud of the vane assembly of FIG. 2 and including a plastic contact surface.

FIG. 6A also shows an outer portion of outer shroud(s) 24 according to another embodiment. Again, outer vane-receiving portion(s) 26 in outer shroud(s) 24 may be configured to permit the insertion of outer end portion(s) 36. However, contact surface(s) 44, which may cooperate with sealing member(s) 40 may be provided by plastic member(s) 54 attached to the outer portion of outer shroud(s) 24. Plastic member(s) 54 may include an injection molded member bonded to or otherwise secured to outer shroud(s) 24. An individual plastic member 54 may be provided for each outer vane-receiving portion(s) 26 or, alternatively, one plastic member 54 may be configured to accommodate a plurality of outer vane-receiving portion(s) 26 in outer shroud(s) 24.

Figure 6B:
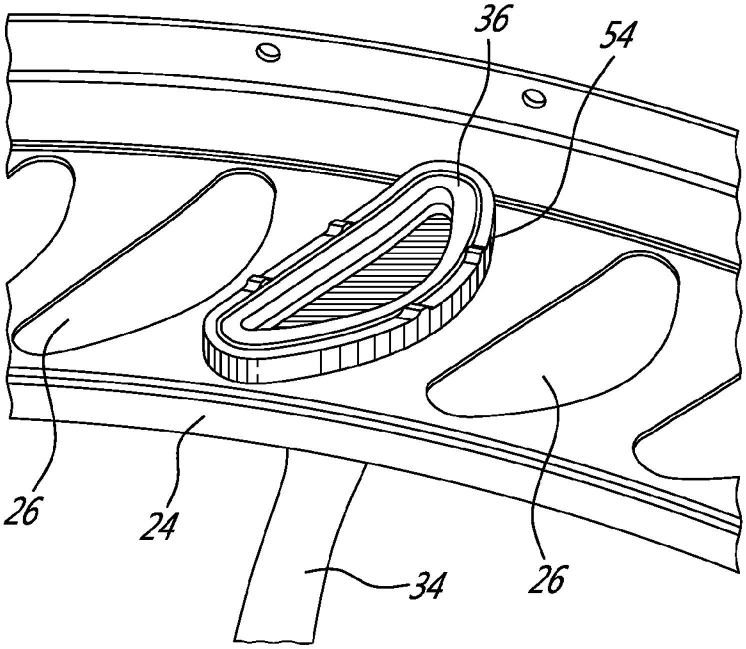
FIG. 6B is a perspective view of the end portion of the vane of FIG. 2 received in the vane-receiving portion of FIG. 6A.

FIG. 6B shows the outer portion of outer shroud(s) 24 as shown in FIG. 6A wherein outer end portion(s) 36 of vane(s) 32 is/are received and supported in outer vane-receiving portion(s) 26. In this configuration, contact surface(s) 44 (shown in FIG. 6A) may face bottom surface(s) 46 of groove(s) 42 (shown in FIG. 4) and also cooperate with bottom surface(s) 46 to contact and compress sealing member(s) 40 (shown in FIG. 2) by a desired amount to provide a desired sealing, support and/or damping performance(s).

Figure 7:
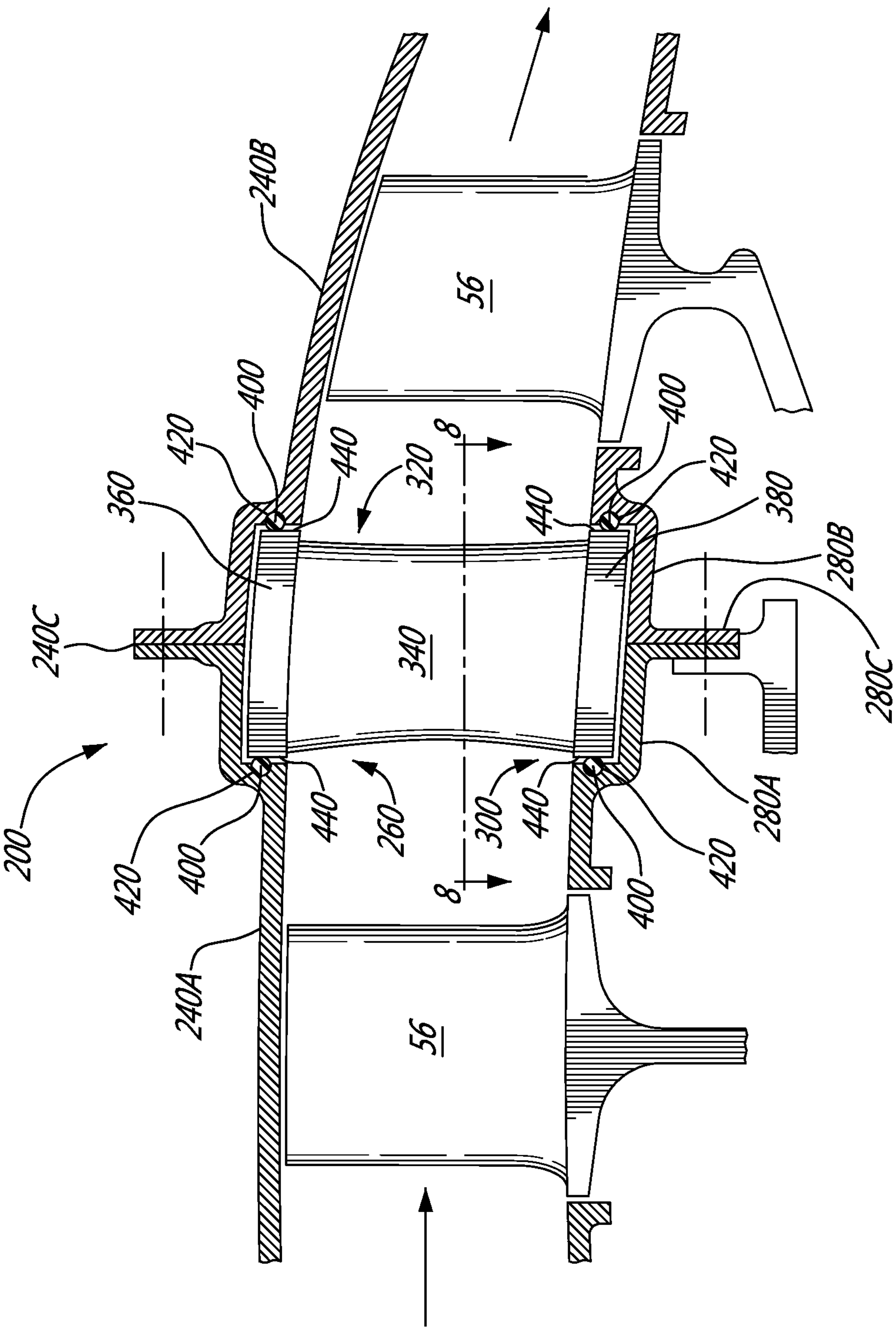
FIG. 7 is a partial axial cross-section view of the engine of FIG. 1 showing a vane assembly in a compressor of the engine.

FIG. 7 shows an axial cross-section view of engine 10 specifically showing vane assembly(ies) 200. Vane assembly(ies) 200 may be disposed in compressor 14 of engine 10. Accordingly, vane assembly(ies) 200 may be disposed adjacent compressor blade(s) 56. Vane assembly(ies) 200 may be disposed upstream, downstream and/or between sets of compressor blade(s) 56. Compressor blade(s) 56 may be configured to rotate and propel (e.g. compress) air towards combustor 16. Vane assembly(ies) 200 may be used to re-direct a stream of air flowing through and being compressed in compressor 14 along a gas path illustrated by arrows in FIG. 7. Vane assembly(ies) 200 may be disposed in a relatively low pressure (e.g. boost) section of compressor 14.

Vane assembly(ies) 200 may comprise outer shroud(s) 240A, 240B including outer vane-receiving portion(s) 260; inner shroud(s) 280A, 280B including inner vane-receiving portion(s) 300; and vane(s) 320. Outer shroud(s) 240A, 240B may, for example, include a radially outer casing of compressor 14. Outer shroud(s) 240A, 240B may comprise multiple pieces. For example, outer shroud(s) 240A, 240B may comprise forward outer shroud portion(s) 240A and aft outer shroud portion(s) 240B. Forward outer shroud portion(s) 240A and aft outer shroud portion(s) 240B may each have an annular configuration and be disposed about (e.g. coaxial to) centerline CL of engine 10. Forward outer shroud portion(s) 240A and aft outer shroud portion(s) 240B may be secured to each other at outer shroud interface(s) 240C. At least one of forward outer shroud portion(s) 240A and aft outer shroud portion(s) 240B may comprise groove(s) 420 for receiving at least a portion of sealing member(s) 400. Groove(s) 420 may extend circumferentially around forward outer shroud portion(s) 240A and/or aft outer shroud portion(s) 240B about centerline CL of engine 10.

Inner shroud(s) 280A, 280B may, for example, include a radially inner casing of compressor 14. Similar to outer shroud(s) 240A, 240B, inner shroud(s) 280A, 280B may also be provided in multiple pieces. For example, inner shroud(s) 280A, 280B may comprise forward inner shroud portion(s) 280A and aft inner shroud portion(s) 280B. Forward inner shroud portion(s) 280A and aft inner shroud portion(s) 280B may also each have an annular configuration and also be disposed about (e.g. coaxial to) centerline CL of engine 10. Forward inner shroud portion(s) 280A and aft inner shroud portion(s) 280B may be secured to each other at inner shroud interface(s) 280C. At least one of forward inner shroud portion(s) 280A and aft inner shroud portion(s) 280B may comprise groove(s) 420 for receiving sealing member(s) 400. Groove(s) 420 may extend circumferentially around forward inner shroud portion(s) 280A and/or aft outer shroud portion(s) 280B. Groove(s) 420 may extend circumferentially around forward outer shroud portion(s) 280A and/or aft outer shroud portion(s) 280B about centerline CL of engine 10.

Vane(s) 320 may include airfoil-shaped body(ies) 340, outer end portion(s) 360 and inner end portion(s) 380. Vane(s) 320 may be stationary and may be used to re-direct a stream of air through compressor 14. Outer end portion(s) 360 and/or inner end portion(s) 380 may comprise contact surface(s) 440. Contact surface(s) 440 may contact sealing member(s) 400. Contact surface(s) 440 and groove(s) 420 may cooperate together to compress sealing member(s) 400 by a desired amount to provide a desired sealing, vibration damping and/or support function(s) between inner/outer shrouds 240A, 240B, 280A, 280B and vane(s) 320. Sealing member(s) 400 between outer end portion(s) 360 and outer vane-receiving portion(s) 260 and/or between inner end portion(s) 380 and inner vane-receiving portion(s) 300 may serve to reduces losses by hindering or substantially preventing air in compressor 14 from flowing through a clearance provided between outer end portion(s) 360 and outer vane-receiving portion(s) 260 and/or between inner end portion(s) 380 and inner vane-receiving portion(s) 300.

Figure 8:
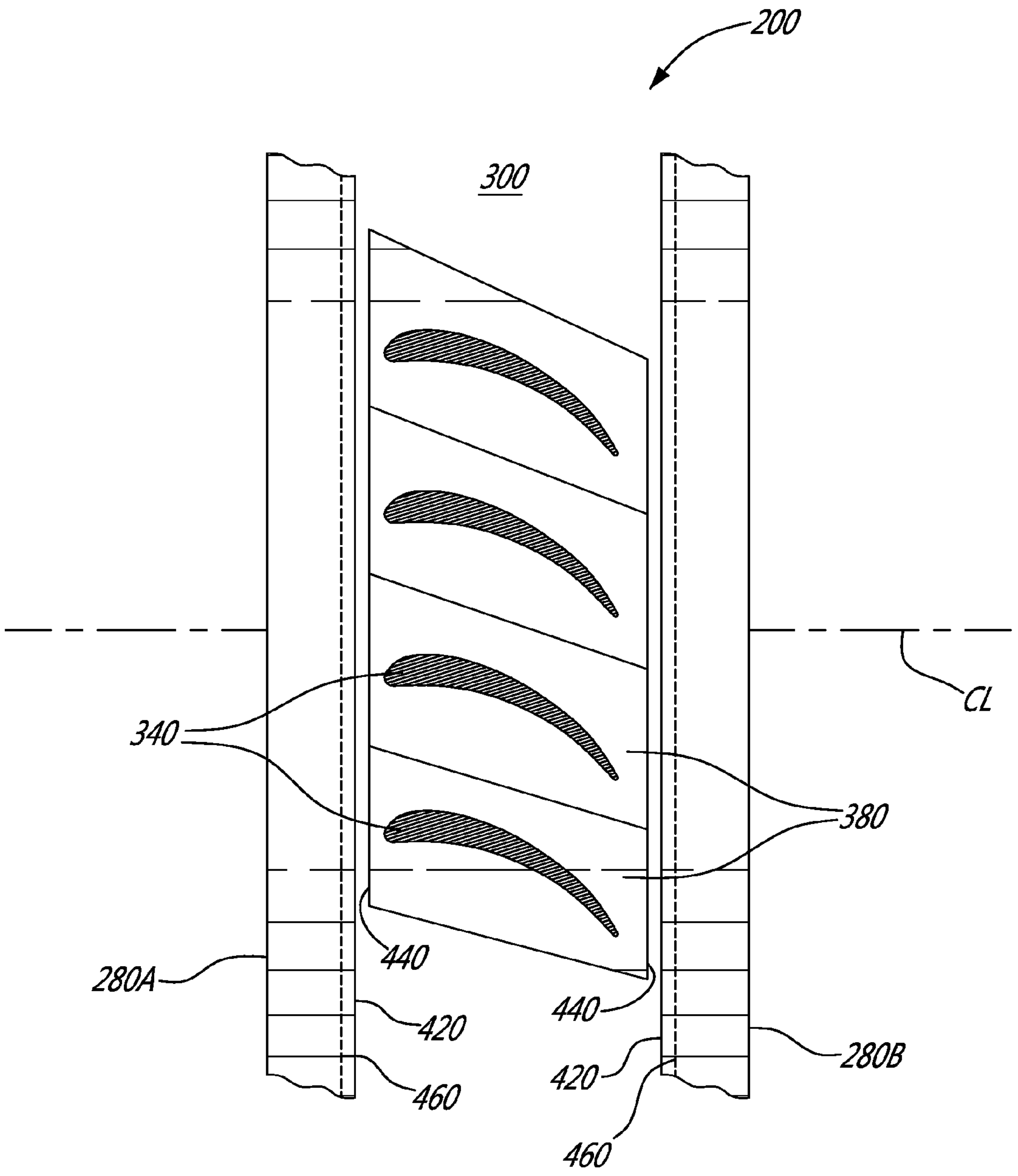
FIG. 8 is a partial cross-section of the vane assembly of FIG. 7 taken along line 8-8 in FIG. 7.

FIG. 8 shows a partial cross-section of the vane assembly of FIG. 7 taken along line 8-8 in FIG. 7. FIG. 8 specifically shows the installation of inner end portion(s) 380 in inner vane-receiving portion(s) 300 however it will be understood that the installation of outer end portion(s) 360 in outer vane-receiving portion(s) 260 may be similar or practically identical. Inner end portion(s) 380 of vane(s) 320 may be in the form of platforms and sealing surface(s) 440 may be provided at forward and aft axial ends of inner end portion(s) 380. Groove(s) 420 provided in inner shroud(s) 280A, 280B may comprise bottom surface(s) 460. Sealing member(s) 400 shown in FIG. 7 may be installed in groove(s) 420. Contact surface(s) 440 and bottom surface(s) 460 of groove(s) 420 may cooperate together to compress sealing member(s) 400 by a desired amount to provide a desired sealing, vibration damping and/or support function(s) between inner/outer shrouds 240A, 240B, 280A, 280B and vane(s) 320. Accordingly, sealing member(s) 400 may not be directly exposed to rapidly flowing air in compressor 14 which could potentially cause lifting, deterioration, erosion and/or other types of wear or performance degradation of sealing member(s) 400.

Sealing member(s) 400 may be of similar or substantially identical construction as sealing member(s) 40 and may also be made from suitable materials as listed above in regards to sealing member(s) 40. For example, sealing member(s) 40, 400 may have a substantially circular and uniform uncompressed cross-section and may comprise one or more o-rings of suitable dimensions (e.g. cross-sectional diameter and outer diameter/length) to be installed in respective groove(s) 42, 420.

The use of sealing member(s) 40, 400 of a substantially circular cross-section between vane(s) 32, 320 and shroud(s) 24, 240A, 240B, 28, 280A, 280B may facilitate assembly of vane assembly(ies) 20, 200. In particular, the assembly of vane assembly(ies) 20, 200 may be relatively more straightforward and quicker. As mentioned above, radial pre-loading of vanes may not be required for the purpose of maintaining a proper sealing function of sealing member(s) 40, 400. For example a method for assembling vane assembly(ies) 20, 200 may comprise: (1) installing sealing member(s) 40, 400 having an uncompressed cross-section that is substantially circular on one of: at least one of end portion(s) 36, 360, 38, 380 of at least one of vane(s) 32, 320; and at least one of vane-receiving portion(s) 26, 260, 30, 300 of at least one of shroud(s) 24, 240A, 240B, 28, 280A, 280B; and (2) installing at least one of end portion(s) 36, 360, 38, 380 of the at least one vane(s) 32, 320 in the at least one vane-receiving portion(s) 26, 260, 30, 300 to establish contact of sealing member(s) 40, 400 with at least one of end portion(s) 36, 360, 38, 380 of the at least one of vane(s) 32, 320 and the at least one vane-receiving portion(s) 26, 260, 30, 300.

Vane(s) 32, 320 could be made by various manufacturing processes including forging, die casting and/or injection molding. For example, vane(s) 32, 320 could be made from materials including an aluminum-based alloy or a polymer material such as polyether ether ketone (PEEK) or Nylon. Vane(s) 32, 320 may, for example, comprise carbon fiber. A structural coating such as a nano-coating may be applied to vane(s) 32, 320 to obtain desired properties (e.g. stiffness and strength) and performance characteristics of vane(s) 32, 320. Groove(s) 42 on vane(s) 32 may be forged or formed simultaneously with the molding of vane(s) 32. Alternatively, groove(s) 42 on vane(s) 32 could be formed (e.g. machined) subsequently to the forming of airfoil-shaped body(ies) 34 of vane(s) 32. Similarly, groove(s) 420 on shroud(s) 240A, 240B, 280A, 280B could be formed by forging or casting during the manufacture of shroud(s) 240A, 240B, 280A, 280B or formed subsequently by machining for example. Shroud(s) 24, 240A, 240B, 28, 280A, 280B may, for example, comprise an aluminum-based alloy.

As mentioned above, sealing member(s) 40, 400 may comprise material(s) that is/are substantially electrically insulating and therefore may allow for dissimilar materials having different electrode potentials to be used for vane(s) 32, 320 and shroud(s) 24, 240A, 240B, 28, 280A, 280B. For example, sealing member(s) 40, 400 may also serve to electrically isolate vane(s) 32, 320 from shroud(s) 24, 240A, 240B, 28, 280A, 280B and prevent risks of galvanic corrosion between vane(s) 32, 320 and shroud(s) 24, 240A, 240B, 28, 280A, 280B.

During use, vane(s) 32, 320 may serve to re-direct air flowing through bypass duct(s) 22 and/or compressor 14. Sealing member(s) 40, 400 disposed between vane(s) 32, 320 and shroud(s) 24, 240A, 240B, 28, 280A, 280B may serve to reduce losses by hindering or substantially preventing air from flowing through a clearance between vane(s) 32, 320 and shroud(s) 24, 240A, 240B, 28, 280A, 280B. Sealing member(s) 40, 400 may also serve to damp vibrations and provide support of vane(s) 32, 320. As described above, sealing member(s) 40, 400 may be compressed (i.e. deformed) by a desired amount when installed between vane(s) 32, 320 and shroud(s) 24, 240A, 240B, 28, 280A, 280B in order to maintain desired sealing, damping and/or support function(s).

The term "at least one" as used herein is intended to mean "one or more than one" of the identified elements.

The above description is meant to be exemplary only, and one skilled in the art will recognize that changes may be made to the embodiments described without departing from the scope of the invention disclosed. For example, the specific configurations of vane assemblies 20 and 200 are not limited respectively for use in bypass duct(s) 22 and compressor 14. It is also intended that aspects from vane assembly(ies) 20 and vane assembly(ies) 200 may be combined (i.e. interchanged). For example, the above description is intended to also include vane assemblies that comprise outer end portion(s) 36, 360 and outer vane-receiving portion(s) 26, 260 as configured in vane assembly(ies) 20 combined with inner end portion(s) 38, 380 and inner vane-receiving portion(s) 30, 300 as configured in vane assembly(ies) 200, or vice versa.

Still other modifications which fall within the scope of the present invention will be apparent to those skilled in the art, in light of a review of this disclosure, and such modifications are intended to fall within the appended claims.

What is claimed is:

1. A compressor vane assembly for use in a gas turbine engine, the assembly comprising:

at least one shroud having at least one vane-receiving portion;

at least one compressor vane having an airfoil defining a span-wise axis and an end portion received in the at least one vane-receiving portion of the at least one shroud, the end portion having an outer peripheral surface, a peripheral groove formed in the outer peripheral surface and extending about an entire perimeter of the end portion, the peripheral groove having a bottom surface and radially inner and outer walls extending from the bottom surface and being radially spaced-apart from each other to define a groove cross-sectional shape, the bottom surface of the peripheral groove forming a groove perimeter profile that, when viewed in a plan view normal to the span-wise axis, has a positive curvature about the entire perimeter of the end portion and the groove perimeter profile is free of concave regions about said entire perimeter; and at least one sealing member being annular and lying in a first plane, the sealing member being resilient and formed of an elastomeric material, the sealing member having a cross-sectional shape taken through a second plane transverse to the first plane, a portion of the sealing member being disposed in the peripheral groove and in contact with the bottom surface thereof, the sealing member follows said groove profile, the cross-sectional shape of the sealing member being different from the groove cross-sectional shape of the peripheral groove;

wherein the sealing member is in contact with both the peripheral groove of the end portion of the compressor vane and the vane-receiving portion of the shroud, the cross-sectional shape of the sealing member being substantially circular when the sealing member is in an uncompressed state and in contact with the peripheral groove and the vane-receiving portion, the cross-sectional shape of the sealing member in the uncompressed state being substantially uniform along a substantially entire sealing length about the annular sealing member.

2. The compressor assembly as defined in claim 1, wherein the at least one vane-receiving portion comprises at least one opening for receiving the at least one end portion of the compressor vane and at least one contact surface configured to contact the at least one sealing member.

3. The compressor assembly as defined in claim 2, wherein the at least one contact surface is provided by at least one sheet metal member attached to the at least one shroud.

4. The compressor assembly as defined in claim 2, wherein the at least one contact surface is provided by at least one injection molded plastic member attached to the at least one shroud.

5. The compressor assembly as defined in claim 1, wherein the at least one vane-receiving portion of the at least one shroud comprises a groove configured to receive a portion of the at least one sealing member.

6. The compressor assembly as defined in claim 5, wherein the at least one vane-receiving portion of the at least one shroud is defined between at least one forward annular shroud portion and at least one aft annular shroud portion, and the groove extends circumferentially around at least one of the at least one forward annular shroud portion and the at least one aft annular shroud portion.

7. The compressor assembly as defined in claim 1, wherein the at least one sealing member is out of a gas path of the gas turbine engine.

8. The compressor assembly as defined in claim 1, wherein the sealing member of the compressor vane is made from an electrically insulating material.

9. The compressor assembly as defined in claim 1, wherein the at least one vane-receiving portion of the at least one shroud includes a radially inner vane receiving portion, the inner vane receiving portion having a groove with a cross-sectional shape being defined by an axially-extending back wall and radially-extending contact surfaces extending from the back wall, the contact surfaces being axially spaced-apart and parallel to each other, the at least one end portion of the at least one compressor vane including a radially-inner end portion being seated within the groove of the inner vane receiving portion, the radially-inner end portion abutting against the back wall of the groove.

10. A gas turbine engine comprising:

at least one inlet, compressor, combustor and turbine section in serial flow communication; and at least one compressor vane assembly disposed within the compressor and downstream from the at least one inlet, the at least one compressor vane assembly including:

at least one radially inner shroud having at least one inner vane-receiving portion;

at least one radially outer shroud having at least one outer vane-receiving portion;

at least one compressor vane having an inner end portion received in the at least one inner vane-receiving portion of the inner shroud and an outer end portion received in the outer vane-receiving portion of the at least one outer shroud, and an airfoil extending along a span-wise axis between the inner and outer end portions, a peripheral groove formed in at least one of the inner end portion and the outer end portion and extending about an entire perimeter thereof, the peripheral groove forming a groove perimeter profile that, when viewed in a plan view normal to the span-wise axis, has a positive curvature and is free of concave regions about said entire perimeter, the peripheral groove having a bottom surface and radially inner and outer walls extending from the bottom surface, the inner and outer walls being radially spaced-apart and parallel to each other; and at least one sealing member being annular and lying in a first plane, the sealing member being resilient and formed of an elastomeric material, the sealing member having a cross-sectional shape taken through a second plane transverse to the first plane, a portion of the sealing member being disposed in the peripheral groove, the peripheral groove having a groove cross-sectional shape defined in said second plane that is different from the cross-sectional shape of the sealing member, the sealing member being disposed in contact with both the peripheral groove in the compressor vane and the corresponding one of the inner vane-receiving portion of the inner shroud and the outer vane-receiving portion of the outer shroud, the cross-sectional shape of the sealing member being substantially circular when the sealing member is in an uncompressed state and in contact with the peripheral groove and the corresponding one of the inner vane-receiving portion and the outer vane-receiving portion, the cross-sectional shape of the sealing member in the uncompressed state being substantially uniform along a substantially entire sealing length about the annular sealing member.

11. The engine as defined in claim 10, wherein at least one of the at least one inner shroud and at least one outer shroud comprises a groove therein configured to receive a portion of the at least one sealing member.

12. The engine as defined in claim 11, wherein the groove extends circumferentially around the at least one of the at least one inner shroud and at least one outer shroud.

13. The engine as defined in claim 10, wherein the at least one sealing member is out of a gas path of the gas turbine engine.

14. The gas turbine engine as defined in claim 10, wherein the sealing member of the compressor vane is made from an electrically insulating material.

15. The engine as defined in claim 10, wherein the at least one inner vane receiving portion has a groove with a cross-sectional shape being defined by an axially-extending back wall and radially-extending contact surfaces extending from the back wall, the contact surfaces being axially spaced-apart and parallel to each other, the at least one inner end portion of the at least one compressor vane being seated within the groove of the at least one inner vane receiving portion, the at least one inner end portion abutting against the back wall of the groove.

16. A method for assembling a compressor vane assembly for use in a gas turbine engine wherein the compressor vane assembly comprises at least one compressor vane and at least one shroud, the method comprising:

providing a pair of annular sealing members for each of the at least one compressor vanes, the sealing members being resilient and formed of an elastomeric material, each of the sealing members lying in a first plane, the sealing members having a cross-sectional shape taken through a second plane transverse to the first plane;

installing one of the sealing members within a peripheral groove defined in each of an inner end portion and an outer end portion of the compressor vane, the peripheral groove extending about an entire perimeter of each of the inner and outer end portions, the peripheral groove having a groove cross-sectional shape defined in said second plane that is different from the cross-sectional shape of the sealing member, the groove cross-sectional shape being defined by a bottom surface of the peripheral groove and radially inner and outer walls extending from the bottom surface, the inner and outer walls being radially spaced-apart and parallel to each other, the bottom surface of the peripheral groove forming a groove perimeter profile that, when viewed in a plan view normal to the span-wise axis, has a positive curvature about the entire perimeter of the inner and outer end portions and the groove perimeter profile is free of concave regions about said entire perimeter, once installed within the peripheral groove the cross-sectional shape of the sealing members being substantially circular and in an uncompressed state; and installing the inner and outer end portions of the compressor vane in respective inner and outer vane-receiving portions of the at least one shroud to establish contact of each of the sealing members with the end portions of the compressor vane and the respective inner and outer vane-receiving portions.

17. The method as defined in claim 16, comprising installing the sealing members in a location out of a gas path of the gas turbine engine.

18. The method as defined in claim 16, comprising maintaining a tension on the sealing members once the sealing members are installed on the respective end portions of the at least one compressor vane.

19. The method as defined in claim 16, comprising installing the sealing members around the respective end portions of the at least one compressor vane.

20. The method as defined in claim 16, comprising installing the sealing members circumferentially around the at least one vane-receiving portion provided on the at least one shroud.

* * * * *